(12) United States Patent
Rakshit et al.

(10) Patent No.: US 10,379,615 B2
(45) Date of Patent: Aug. 13, 2019

(54) PROVIDING HAPTIC FEEDBACK TO A USER OF A TOUCH SURFACE DISPLAY

(71) Applicant: International Business Machines Corporation, Armonk, NY (US)

(72) Inventors: Sarbajit K. Rakshit, Kolkata (IN); John D. Wilson, League City, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 327 days.

(21) Appl. No.: 14/963,585

(22) Filed: Dec. 9, 2015

(65) Prior Publication Data
US 2017/0168569 A1   Jun. 15, 2017

(51) Int. Cl.
| | | |
|---|---|---|
| G06F 3/0481 | (2013.01) | |
| G06F 3/0482 | (2013.01) | |
| G06F 3/0484 | (2013.01) | |
| G06F 3/0488 | (2013.01) | |
| G06F 3/01 | (2006.01) | |

(52) U.S. Cl.
CPC ............ *G06F 3/016* (2013.01); *G06F 3/0482* (2013.01); *G06F 3/0488* (2013.01); *G06F 3/04817* (2013.01); *G06F 3/04845* (2013.01); *G06F 3/04886* (2013.01); *G06F 2203/04803* (2013.01); *G06F 2203/04808* (2013.01)

(58) Field of Classification Search
CPC .... G06F 3/016; G06F 3/0488; G06F 3/04883; G06F 3/04817; G06F 3/0482; G06F 3/04845; G06F 3/04886; G06F 2203/04803; G06F 2203/04808
See application file for complete search history.

(56) References Cited

U.S. PATENT DOCUMENTS

| | | |
|---|---|---|
| 6,498,590 B1 | 12/2002 | Dietz et al. |
| 7,148,875 B2 | 12/2006 | Rosenberg et al. |

(Continued)

FOREIGN PATENT DOCUMENTS

| | | |
|---|---|---|
| EP | 1710672 A2 | 10/2006 |
| WO | 2013169853 A1 | 11/2013 |

OTHER PUBLICATIONS

Stodle et al.; "Gesture-Based, Touch-Free Multi-User Gaming on Wall-Sized, High-Resolution Tiled Displays"; Journal of Virtual Reality and Broadcasting, vol. 5, No. 10 (2008); 13 pages.

*Primary Examiner* — Aaron Lowenberger
(74) *Attorney, Agent, or Firm* — Cantor Colburn LLP; David Zwick

(57) ABSTRACT

Embodiments include method, systems and computer program products for providing a haptic feedback signal to a user of a touch surface display. Aspects include providing a plurality of partitions within the touch surface display via a processor. Aspects further include displaying a plurality of content icons via the touch surface display, wherein the plurality of content icons correspond to a plurality of content files. Based on a touch input received from the user via the touch surface display aspects also include manipulating at least one of the plurality of content icons in response to the touch input via the processor. Aspects further includes providing the haptic feedback signal to the user in response to the at least one of the plurality of content icons traversing at least one of the plurality of partitions via a haptic feedback device.

20 Claims, 5 Drawing Sheets

(56) References Cited

U.S. PATENT DOCUMENTS

| | | |
|---|---|---|
| 7,337,400 B1 | 2/2008 | Elbing et al. |
| 8,350,818 B2 | 1/2013 | Fritzley et al. |
| 8,375,336 B2 | 2/2013 | Matthews et al. |
| 8,593,409 B1 | 11/2013 | Heubel et al. |
| 8,621,348 B2 | 12/2013 | Ramsay et al. |
| 8,656,461 B2 | 2/2014 | Kaza et al. |
| 2002/0044132 A1 | 4/2002 | Fish |
| 2005/0248549 A1* | 11/2005 | Dietz ............... G06F 3/016 345/179 |
| 2006/0256075 A1 | 11/2006 | Anastas et al. |
| 2007/0110233 A1 | 5/2007 | Polk et al. |
| 2007/0182718 A1 | 8/2007 | Schoener et al. |
| 2008/0180399 A1 | 7/2008 | Cheng |
| 2009/0096746 A1* | 4/2009 | Kruse ............... G06F 3/014 345/156 |
| 2011/0248916 A1* | 10/2011 | Griffin ............. G06F 3/016 345/157 |
| 2012/0138371 A1 | 6/2012 | Wu |
| 2012/0253942 A1 | 10/2012 | Garfinkle et al. |
| 2014/0368445 A1* | 12/2014 | Feng ............... G06F 3/016 345/173 |
| 2015/0067497 A1* | 3/2015 | Cieplinski ......... G06F 3/016 715/702 |
| 2015/0253850 A1* | 9/2015 | Behles ............. G06F 3/0488 715/702 |

* cited by examiner

PROVIDING HAPTIC FEEDBACK TO A USER OF A TOUCH SURFACE DISPLAY

BACKGROUND

The present disclosure relates to haptic feedback, and more specifically, to methods, systems and computer program products for providing haptic feedback to a user of a touch surface display.

Touch surface displays are often used for multi-user collaboration. In general, multiple users may utilize a single touch surface display to create and share information.

In addition, touch surface displays can be divided into multiple sections to provide sections assigned to a certain user or activity. In certain applications, content can be navigated individually and across sections or partitions to be associated with a different user or activity.

Users may easily be able to share information between users or activities. Currently, users may receive haptic feedback associated with certain events that occur within the touch surface display. However, users do not receive feedback as content is moved between sections or partitions associated with a different user or activity.

SUMMARY

In accordance with an embodiment, a method for providing a haptic feedback signal to a user of a touch surface display is provided. The method includes providing a plurality of partitions within the touch surface display via a processor. The method further includes displaying a plurality of content icons via the touch surface display, wherein the plurality of content icons correspond to a plurality of content files. Based on a touch input received from the user via the touch surface display the method also includes manipulating at least one of the plurality of content icons in response to the touch input via the processor. The method further includes providing the haptic feedback signal to the user in response to the at least one of the plurality of content icons traversing at least one of the plurality of partitions via a haptic feedback device.

In accordance with a further embodiment, a computer program product for providing a haptic feedback signal to a user of a touch surface display includes a non-transitory storage medium readable by a processing circuit and storing instructions for execution by the processing circuit for performing a method. The method includes providing a plurality of partitions within the touch surface display via a processor. The method further includes displaying a plurality of content icons via the touch surface display, wherein the plurality of content icons correspond to a plurality of content files. Based on a touch input received from the user via the touch surface display the method also includes manipulating at least one of the plurality of content icons in response to the touch input via the processor. The method further includes providing the haptic feedback signal to the user in response to the at least one of the plurality of content icons traversing at least one of the plurality of partitions via a haptic feedback device.

In accordance with another embodiment, a haptic feedback system for providing a haptic feedback signal to a user of a touch surface display with a haptic feedback device is provided. The processor is configured to provide a plurality of partitions within the touch surface display. The processor is further configured to display a plurality of content icons, wherein the plurality of content icons correspond to a plurality of content files. Based on a touch input from the user, the processor can also manipulate at least one of the plurality of content icons in response to the touch input. The processor is further configured to provide the haptic feedback signal to the user in response to the at least one of the plurality of content icons traversing at least one of the plurality of partitions.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

In accordance with exemplary embodiments of the disclosure, methods, systems and computer program products for providing a haptic feedback signal to a user of a touch surface display are provided. In exemplary embodiments, providing a haptic feedback signal includes providing a plurality of partitions within the touch surface display via a processor. In exemplary embodiments, a plurality of content icons are displayed via the touch surface display, wherein the plurality of content icons correspond to a plurality of content files. In exemplary embodiments, a touch input received from the user via the touch surface display. In exemplary embodiments, at least one of the plurality of content icons are manipulated in response to the touch input via the processor. In exemplary embodiments, the haptic feedback signal are provided to the user in response to the at least one of the plurality of content icons traversing at least one of the plurality of partitions via a haptic feedback device.

Figure 1:
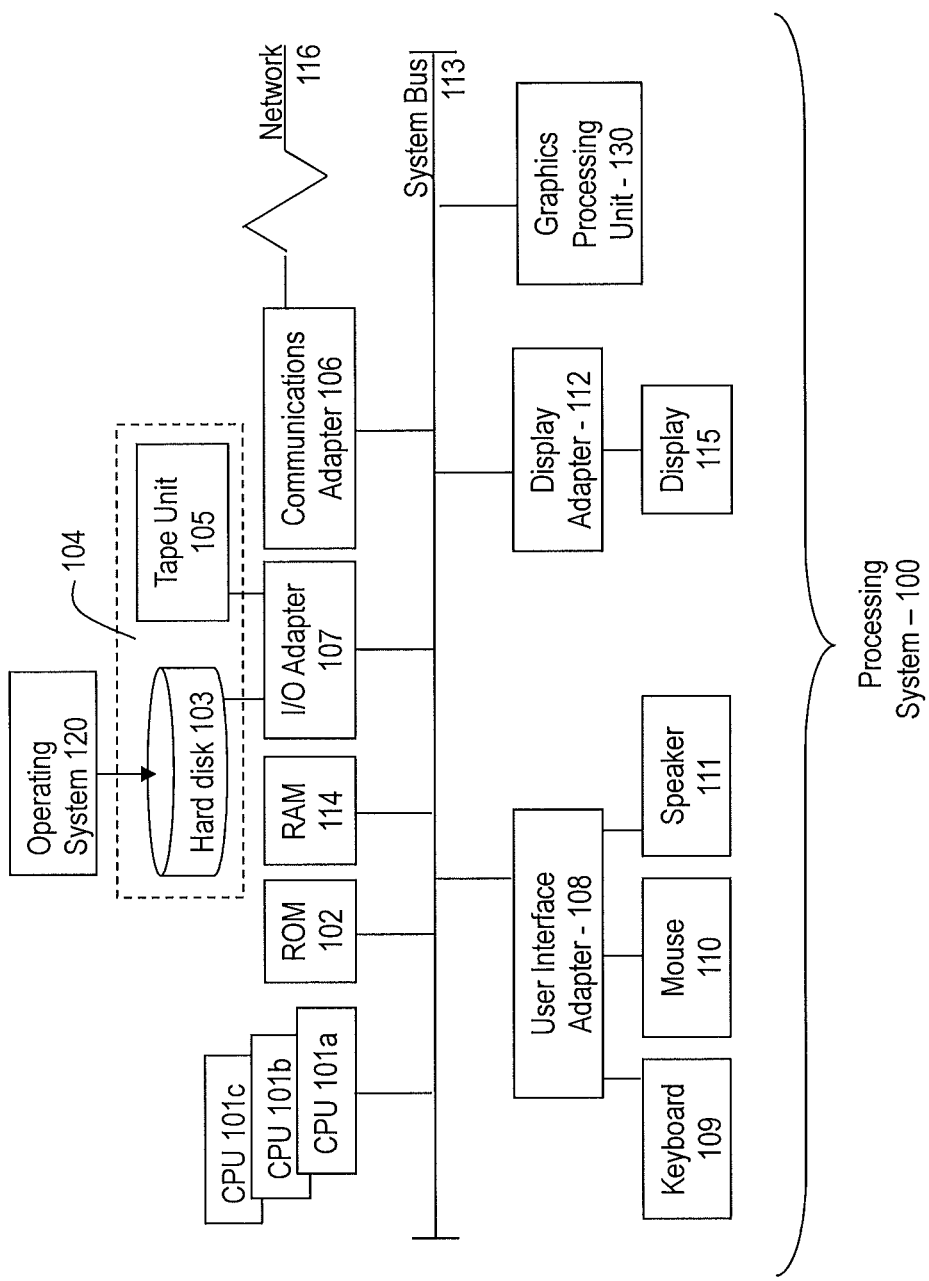
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2:
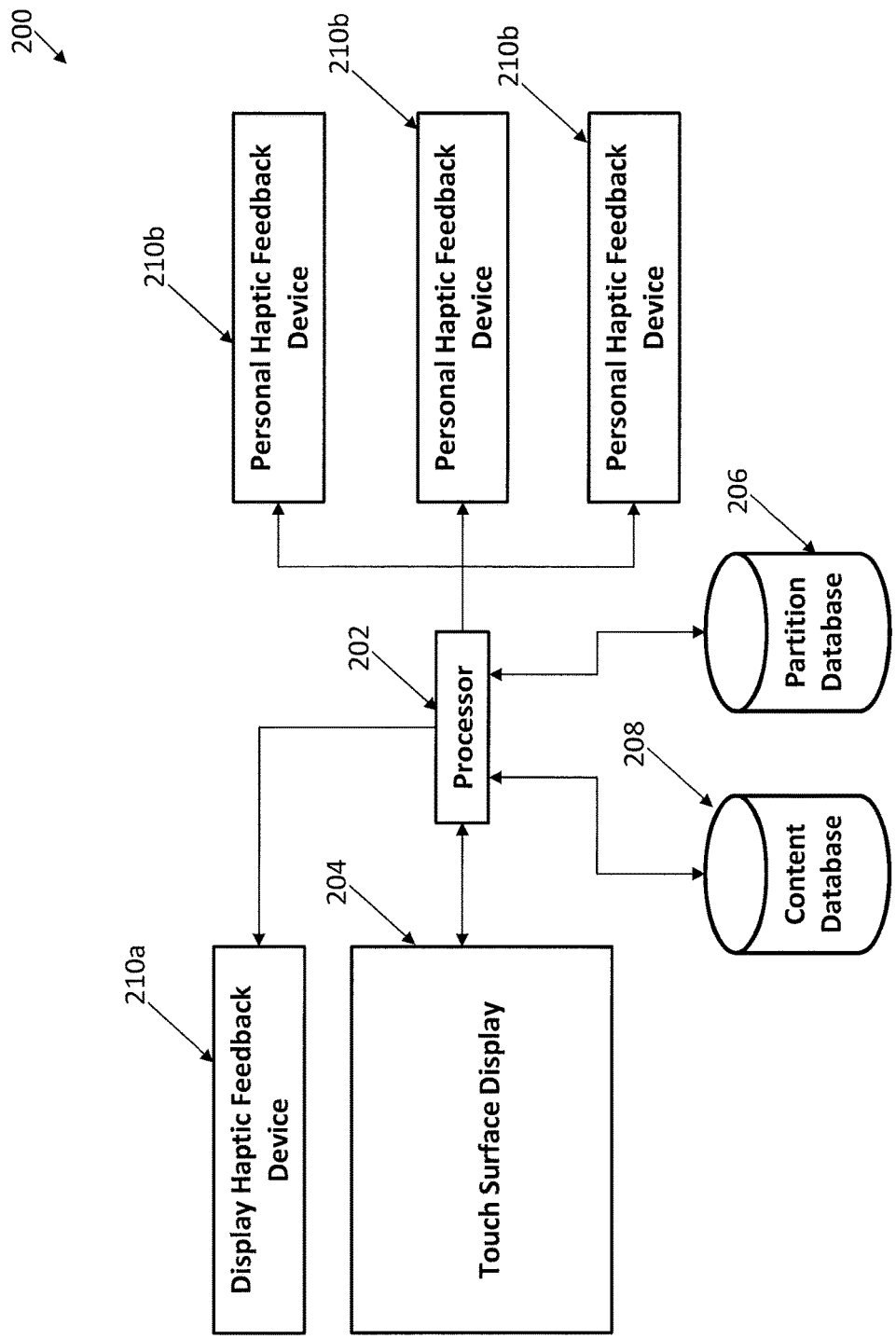
FIG. 2 is a block diagram illustrating a haptic feedback system in accordance with an exemplary embodiment.

Referring now to FIG. 2, a haptic feedback system 200 in accordance with an exemplary embodiment is illustrated. In an exemplary embodiment, the haptic feedback system 200 includes a processor 202, a touch surface display 204, and a display haptic feedback device 210a. In certain embodiments, the haptic feedback system 200 includes a processor 202, a touch surface display 204, and at least one personal haptic feedback device 210b. In certain embodiments, the haptic feedback system 200 includes a processor 202, a touch surface display 204, a display haptic feedback device 210a, and at least one personal haptic feedback device 210b. In exemplary embodiments, the processor 202 may include a processing system similar to the one described with reference to FIG. 1. In an exemplary embodiment, the haptic feedback system 200 can provide haptic feedback to one or more users as content is transferred between partitions or users within the touch surface display 204.

In an exemplary embodiment, a touch surface display 204 can display information, and receive touch input from at least one user. In certain embodiments, the touch surface display 204 can be intended for use by a single user. In an exemplary embodiment, the touch surface display 204 is suitable for use by multiple users. The touch surface display 204 can utilize any suitable touch surface technology and support any number of users.

In certain embodiments, the haptic feedback system 200 includes a display haptic feedback device 210a. In certain embodiments, the display haptic feedback device 210a is coupled or otherwise associated with the touch surface display 204 to provide haptic feedback signals through the touch surface display 204 to at least one user. In certain embodiments, the display haptic feedback device 210a can utilize a magnetic assembly, a vibration motor, etc. to provide haptic feedback signals to the touch surface display 204 to provide a haptic feedback signal to at least one user. In certain embodiments, the haptic feedback device 210a can provide generalized haptic feedback signals to be experienced by all users of the touch surface display 204. In other embodiments, the display haptic feedback device 210a can provide localized or otherwise personalized haptic feedback signals to various portions of the touch surface display 204 by isolating various regions of the touch surface display 204. In certain embodiments, multiple display haptic feedback devices 210a can be utilized to localize and personalize haptic feedback signals. In other embodiments, a single display haptic feedback device 210a can utilize any suitable method to localize haptic feedback to a certain area or user of the touch surface display 204.

In certain embodiments, the haptic feedback system 200 can include at least one personal haptic feedback device 210b that corresponds to each user. In certain embodiments, the haptic feedback system 200 can utilize one or more personal haptic feedback devices 210b in addition to, or in lieu of the display haptic feedback device 210a. In certain embodiments, the personal haptic feedback device 210b can provide individualized haptic feedback signals to users. In certain embodiments, each user can be coupled to a personal haptic feedback device 210b, to receive haptic feedback signals independently from the touch surface display 204. In certain embodiments, the personal haptic feedback device 210b is a personal device such as a wrist device, a fob, or a pendant. In certain embodiments, the personal haptic feedback device 210b is a dedicated device. In other embodiments, the personal haptic feedback device 210b is a smart device such as a smart phone or tablet with an application to interface with the processor 202. Advantageously, personal haptic feedback devices 210b can provide individualized haptic feedback signals to multiple users using a single touch surface display 204.

In an exemplary embodiment, the haptic feedback system 200 includes a processor 202 to provide haptic feedback signals to the users of the haptic feedback system 200 in response to user manipulations within the touch surface display 204. In exemplary embodiments, the processor 202 is associated with a partition database 206 and a content database 208. In exemplary embodiments, the processor 202 can provide haptic feedback signals via at least one of the display haptic feedback device 210a and the personal haptic feedback device 210b. In an exemplary embodiment, the processor 202 can determine how to provide haptic feedback signals to the users of the haptic feedback system 200. Haptic feedback signals may be user configurable, and can include vibrations, impulses, or any other suitable haptic feedback.

In an exemplary embodiment, information regarding graphical or logical partitions can be stored within a partition database 206. In an exemplary embodiment, partitions can be utilized to logically or graphically divide the touch surface display 204 into multiple sections. In certain embodiments, partitions can be associated with different users or different activities. In an exemplary embodiment, haptic feedback signals can be provided via the display haptic feedback device 210a and/or the personal haptic feedback device 210b in response to a user interacting with a partition via the touch surface display 204.

In an exemplary embodiment, content to be manipulated by users via the touch surface display 204 can be stored within a content database 208. In an exemplary embodiment, content within the content database 208 can be represented on the touch surface display 204 as icons, text, or any other suitable graphical representation of the content. Content can include any suitable file type such as documents, music, video, pictures, etc. In certain embodiments, the haptic feedback system 200 can identify characteristics of content such as read-only, confidential, etc. In an exemplary embodiment, a user can manipulate a graphical representation of content or a group of content files to manipulate the content between partitions. In an exemplary embodiment, content or files can be transferred between partitions by a user manipulating a representation of the content or files on the touch surface display 204. In an exemplary embodiment, the haptic feedback system 200 can provide haptic feedback signals via the display haptic feedback device 210a and/or the personal haptic feedback device 210b in response to content or files being transferred between partitions.

Figure 3:
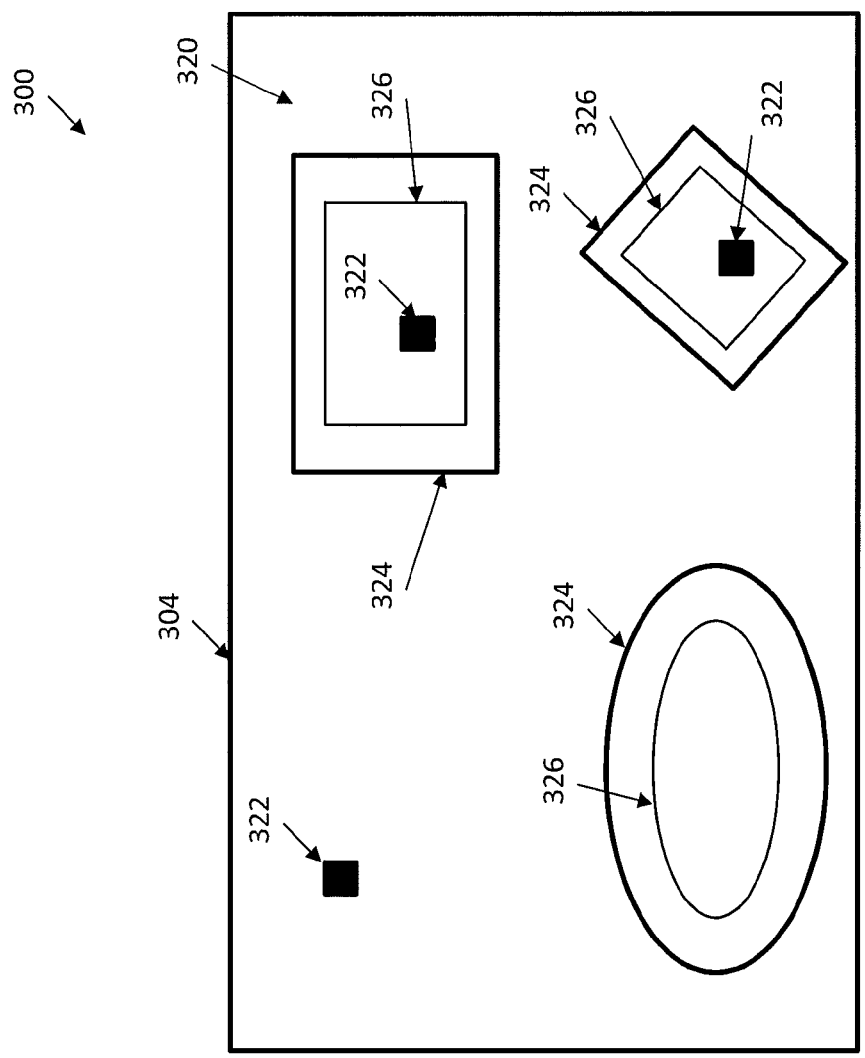
FIG. 3 is a schematic diagram illustrated a haptic feedback interface in accordance with an exemplary embodiment for use with the haptic feedback system of FIG. 2.

In an exemplary embodiment, the processor 202 can be utilized to provide a haptic feedback interface for use with the touch surface display 204. In an exemplary embodiment, the processor 202 can facilitate the use of partitions and for users to manipulate representations of content on the touch surface display 204 while providing haptic feedback signals via the display haptic feedback device 210a and/or the personal haptic feedback device 210b. Referring to FIG. 3, a haptic feedback interface 300 is shown. In an exemplary embodiment, the haptic feedback interface 300 is utilized with the touch surface display 304. As illustrated, the touch surface display 304 includes a screen area 320 that can include content icons 322, partitions 324, and boundary areas 326. In an exemplary embodiment, as users interface with the touch surface display 304, they can receive haptic feedback signals as previously described.

In an exemplary embodiment, the touch surface interface 300 is displayed on the touch surface display 304. In an exemplary embodiment, the touch surface display 304 is a suitable touch sensitive display as previously described. The touch surface display 304 can include a screen area 320. In an exemplary embodiment, the screen area 320 is suitable for use by multiple users and can include partitions 324 and content 322 displayed therein. In certain embodiments, the screen area 320 can include areas not bounded by partitions 324 and may be considered non-partitioned areas. In an exemplary embodiment, while a user may be associated with a partition 324, a user may interact with any suitable portion of the screen area 320.

In an exemplary embodiment, the haptic feedback interface 300 includes content icons 322. In an exemplary embodiment, the content icons 322 are graphical representations of content or files that are stored in or correspond to content found or linked to the content database 208. In an exemplary embodiment, the content icons 322 can be manipulated by users via touch input. The manipulation of the content icons 322 allows for users to transfer the represented files or content as desired. In an exemplary embodiment, the haptic feedback interface 300 can identify the content type or parameters of the content associated with the content icons 322 by providing audio, visual, or haptic feedback signals. In certain embodiments, the haptic feedback signals provided by the haptic feedback interface 300 depend on the properties of the represented content or file. For example, confidential files or content represented by content icons 322 may provide a distinct or unique haptic feedback signal to a user when manipulated.

In an exemplary embodiment, the haptic feedback interface 300 includes partitions 324. In certain embodiments, the partitions 324 can be displayed in the screen area 320. In certain embodiments, partitions 324 are maintained by the haptic feedback interface 300 but are not shown in the screen area 320. In an exemplary embodiment, the partitions 324 are graphical representations of the partitions that are stored or correspond to the partition database 206. In an exemplary embodiment, the partitions 324 identify boundaries within the screen area 320 to allow the screen area 320 to be divided into multiple sections. In an exemplary embodiment, the partitions 324 can be assigned or associated to different users or activities. In certain embodiments, partitions 324 can be associated to multiple users or activities, or multiple partitions can be associated with a user or activity. Partitions 324 can be formed by creating boundaries within the screen area 320, drawing lines within the screen area 320, or bending the touch surface display 304, etc. As illustrated, the partitions 324 can be any suitable shape, and the haptic feedback interface 300 can include any suitable number of partitions 324.

In an exemplary embodiment, each partition 324 can be utilized as an isolated section associated with a user or an activity. In certain embodiments, a user may transfer content icons 322 out of a partition 324 or into a partition 324. As a certain user moves or traverses a content icon 322 beyond a partition 324 boundary, the haptic feedback interface 300 can provide haptic feedback signals either through the display or a personal device as previously described. In certain embodiments, a receiving user can further receive haptic feedback signals corresponding to the receipt of a content icon 322 and the corresponding content into the respective partition 324. In an exemplary embodiment, the type, frequency, and intensity of the haptic feedback signals received by each user can be defined by the user, processor, software, etc. In certain embodiments, haptic feedback signals provided to a user can be defined or selected corresponding to each respective partition 324.

In an exemplary embodiment, the haptic feedback interface 300 can provide a specified haptic feedback signal in response to user actions, such as a user initiating a file transfer or a user initiating a delete action of a file. In an exemplary embodiment, the haptic feedback interface 300 can provide a specified haptic feedback signal if a content icon 322 corresponding to a confidential file or a file that should otherwise not be shared is attempted to be shared with another partition 324. In certain embodiments, the haptic feedback interface 300 can identify permissions of content associated with content icons 322 and provide warnings via haptic feedback signals if a transfer is permissible with a given partition 324. In certain embodiments, the haptic feedback interface 300 can provide a specified haptic feedback signal if a user intends to delete a file corresponding to a content icon 322. In certain embodiments, the specified haptic feedback signal can correspond to a user lacking permissions or access to perform a delete operation, or if a delete operation is not appropriate or permissible for the file the user intends to delete or otherwise modify.

In certain embodiments, the partitions 324 can include boundary areas 326. In certain embodiments, the haptic feedback interface 300 can provide haptic feedback signals to the user as the user drags or otherwise moves a content icon 322 into a boundary area 326 to indicate to the user that the user is approaching a boundary of the partition 324. In certain embodiments, the intensity or frequency of the haptic feedback signal can increase as the content icon 322 is in the boundary area 326 and the distance to the edge of the partition 324 decreases. In certain embodiments, the haptic feedback signal within the boundary area 326 can indicate to a user that the user is dragging a content icon 322 out of a specific partition 324 and potentially initiating a transfer of the underlying content.

Figure 4:
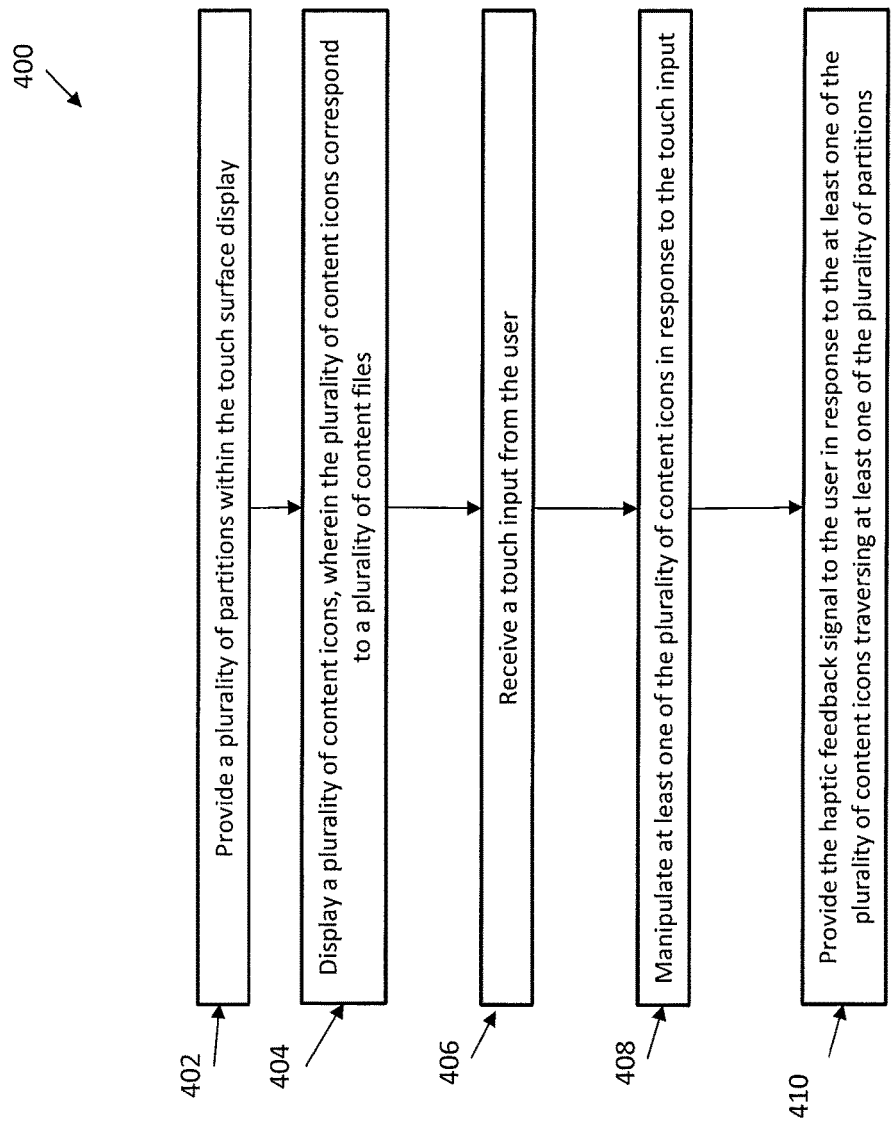
FIG. 4 is a flow diagram of a method for providing haptic feedback to a user in accordance with an exemplary embodiment.

Referring now to FIG. 4, a flow diagram of a method 400 for providing haptic feedback to a user in accordance with an exemplary embodiment is shown. As shown at block 402, a plurality of partitions are provided within the touch surface display. In an exemplary embodiment, the partitions are graphical representations of the partitions that are stored or correspond to the partition database. In an exemplary embodiment, the partitions identify boundaries within the screen area to allow the screen area to be divided into multiple sections.

As shown at block 404, a plurality of content icons are displayed, wherein the plurality of content icons correspond to a plurality of content files. In an exemplary embodiment, the content icons are graphical representations of content or files that are stored in or correspond to content found or linked to the content database.

As shown at block 406, a touch input is received from the user. As shown at block 408, at least one of the plurality of content icons is manipulated in response to the touch input. In an exemplary embodiment, the content icons can be manipulated by users via touch input. The manipulation of the content icons allows for users to transfer the represented files or content as desired.

As shown at block 410, the haptic feedback signal is provided to the user in response to the at least one of the plurality of content icons traversing at least one of the plurality of partitions. In certain embodiments, a user may transfer content icons out of a partition or into a partition. As a certain user moves or traverses a content icon beyond a partition boundary, the haptic feedback interface can provide haptic feedback signals either through the display or a personal device as previously described.

Figure 5:
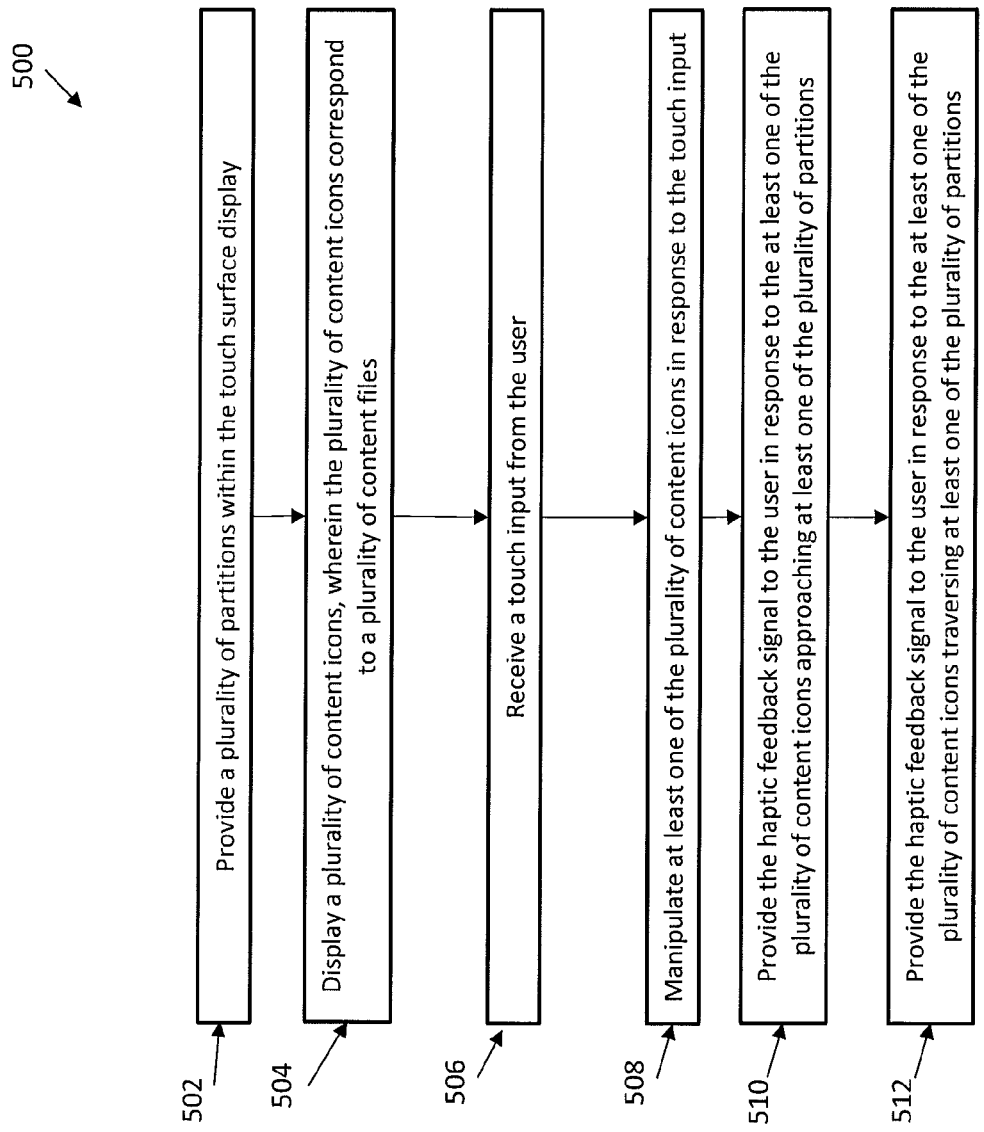
FIG. 5 is a flow diagram of a method for providing haptic feedback to a user in accordance with an exemplary embodiment.

Referring now to FIG. 5, a flow diagram of a method 500 for providing haptic feedback to a user in accordance with an exemplary embodiment is shown. As shown at block 502, a plurality of partitions are provided within the touch surface display. As shown at block 504, a plurality of content icons are displayed, wherein the plurality of content icons correspond to a plurality of content files. As shown at block 506, a touch input is received from the user. As shown at block 508, at least one of the plurality of content icons is manipulated in response to the touch input. As shown at block 510, the haptic feedback signal is provided to the user in response to the at least one of the plurality of content icons approaching at least one of the plurality of partitions. In certain embodiments, the haptic feedback interface can provide haptic feedback signals to the user as the user drags or otherwise moves a content icon into a boundary area to indicate to the user that the user is approaching a boundary of the partition. In certain embodiments, the intensity or frequency of the haptic feedback signal can increase as the content icon is in the boundary area and the distance to the edge of the partition decreases. As shown at block 512, the haptic feedback signal is provided to the user in response to the at least one of the plurality of content icons traversing at least one of the plurality of partitions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting-data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for providing a haptic feedback signal to a user of a touch surface display, the method comprising:
    forming a plurality of partitions within the touch surface display via a processor;
    displaying a plurality of content icons via the touch surface display, wherein the plurality of content icons correspond to a plurality of content files;
    receiving a touch input from the user via the touch surface display;
    manipulating at least one of the plurality of content icons in response to the touch input via the processor; and
    providing the haptic feedback signal to the user in response to the at least one of the plurality of content icons traversing at least one of the plurality of partitions via a haptic feedback device, wherein the haptic feedback signal is provided to the user with an intensity that increases as a distance between the at least one of the plurality of content icons and an edge of the at least one of the plurality of partitions decreases during the manipulation;
    wherein the haptic feedback signal corresponds to an impermissible user action, wherein the impermissible user action includes the user initiating a transfer of a confidential content file from a first partition of the plurality of partitions to a second partition of the plurality of partitions, wherein the at least one of the plurality of content icons corresponds with the confidential content file, wherein the impermissible user action is impermissible at least because the confidential content file is confidential.

2. The computer-implemented method of claim 1, wherein the plurality of partitions within the touch surface display are defined via the processor.

3. The computer implemented method of claim 1, wherein the haptic feedback signal is provided to the user via a display haptic feedback device coupled to the touch surface display.

4. The computer implemented method of claim 1, wherein the haptic feedback signal is provided to the user via a personal haptic feedback device worn by the user.

5. The computer implemented method of claim 1, wherein the touch surface display has a plurality of users and the haptic feedback signal corresponds to at least one of the plurality of users.

6. The computer implemented method of claim 1, wherein the haptic feedback signal corresponds to at least one of the plurality of content files.

7. The computer implemented method of claim 1, wherein the haptic feedback signal corresponds to at least one of the plurality of partitions.

8. The computer implemented method of claim 1, wherein the user configures the haptic feedback signal.

9. The computer implemented method of claim 1, further comprising providing the haptic feedback signal to the user in response to the at least one of the plurality of content icons approaching at least one of the plurality of partitions.

10. The computer implemented method of claim 1, wherein the impermissible user action further includes the user initiating a delete operation to delete the confidential content file, wherein the user lacks permission to perform the delete operation.

11. A computer program product for providing a haptic feedback signal to a user of a touch surface display, the computer program product comprising:
    a non-transitory storage medium readable by a processing circuit and storing instructions for execution by the processing circuit for performing a method comprising:
        forming a plurality of partitions within the touch surface display;
        displaying a plurality of content icons via the touch surface display, wherein the plurality of content icons correspond to a plurality of content files;
        receiving a touch input from the user via the touch surface display;

manipulating at least one of the plurality of content icons in response to the touch input; and providing the haptic feedback signal to the user in response to the at least one of the plurality of content icons traversing at least one of the plurality of partitions via a haptic feedback device, wherein the haptic feedback signal is provided to the user with an intensity that increases as a distance between the at least one of the plurality of content icons and an edge of the at least one of the plurality of partitions decreases during the manipulation;

wherein the haptic feedback signal corresponds to an impermissible user action, wherein the impermissible user action includes the user initiating a transfer of a confidential content file from a first partition of the plurality of partitions to a second partition of the plurality of partitions, wherein the at least one of the plurality of content icons corresponds with the confidential content file, wherein the impermissible user action is impermissible at least because the confidential content file is confidential.

12. The computer program product of claim 11, wherein the haptic feedback signal is provided to the user via a display haptic feedback device coupled to the touch surface display.

13. The computer program product of claim 11, wherein the haptic feedback signal is provided to the user via a personal haptic feedback device worn by the user.

14. The computer program product of claim 11, wherein the touch surface display has a plurality of users and the haptic feedback signal corresponds to at least one of the plurality of users.

15. The computer program product of claim 11, the method further comprising providing the haptic feedback signal to the user in response to the at least one of the plurality of content icons approaching at least one of the plurality of partitions.

16. A haptic feedback system for providing a haptic feedback signal to a user of a touch surface display with a haptic feedback device, comprising:
a processor in communication with one or more types of memory, the processor configured to:
form a plurality of partitions within the touch surface display;
display a plurality of content icons, wherein the plurality of content icons correspond to a plurality of content files;
receive a touch input from the user;
manipulate at least one of the plurality of content icons in response to the touch input; and
provide the haptic feedback signal to the user in response to the at least one of the plurality of content icons traversing at least one of the plurality of partitions, wherein the haptic feedback signal is provided to the user with an intensity that increases as a distance between the at least one of the plurality of content icons and an edge of the at least one of the plurality of partitions decreases during the manipulation;
wherein the haptic feedback signal corresponds to an impermissible user action, wherein the impermissible user action includes the user initiating a transfer of a confidential content file from a first partition of the plurality of partitions to a second partition of the plurality of partitions, wherein the at least one of the plurality of content icons corresponds with the confidential content file, wherein the impermissible user action is impermissible at least because the confidential content file is confidential.

17. The haptic feedback system of claim 16, wherein the haptic feedback signal is provided to the user via a display haptic feedback device coupled to the touch surface display.

18. The haptic feedback system of claim 16, wherein the haptic feedback signal is provided to the user via a personal haptic feedback device worn by the user.

19. The haptic feedback system of claim 16, wherein the touch surface display has a plurality of users and the haptic feedback signal corresponds to at least one of the plurality of users.

20. The haptic feedback system of claim 16, wherein the processor is further configured to provide the haptic feedback signal to the user in response to the at least one of the plurality of content icons approaching at least one of the plurality of partitions.

* * * * *